United States Patent
Libera et al.

(10) Patent No.: US 9,897,010 B2
(45) Date of Patent: Feb. 20, 2018

(54) AIR TURBINE STARTER SYSTEMS INCLUDING GEARBOX-INTEGRATED CLUTCH MODULES AND GAS TURBINE ENGINES EMPLOYING THE SAME

(71) Applicant: HONEYWELL INTERNATIONAL INC., Morristown, NJ (US)

(72) Inventors: Tony Libera, Tempe, AZ (US); Ronald Pardini, Chandler, AZ (US); Ronald A. Peck, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 395 days.

(21) Appl. No.: 14/672,689

(22) Filed: Mar. 30, 2015

(65) Prior Publication Data
US 2016/0290240 A1   Oct. 6, 2016

(51) Int. Cl.
*F02C 7/277* (2006.01)
*F01D 25/20* (2006.01)
(Continued)

(52) U.S. Cl.
CPC .............. *F02C 7/277* (2013.01); *F01D 25/20* (2013.01); *F02C 7/32* (2013.01); *F02C 7/36* (2013.01);
(Continued)

(58) Field of Classification Search
CPC .... F02C 7/277; F02C 7/32; F02C 7/36; F01D 25/20; F05D 2220/32; F05D 2230/51; F05D 2260/35; F05D 2260/4023; F05D 2260/4031; F16D 2041/0665; F16D 41/069; F16D 41/07; F16D 2300/06
(Continued)

(56) References Cited

U.S. PATENT DOCUMENTS 414,545 A * 11/1889 Jones ................... F16H 63/3416
    74/577 R
4,871,296 A * 10/1989 Laessle ................... F02C 7/277
    192/56.61
(Continued)

FOREIGN PATENT DOCUMENTS

EP          0344454 A2     12/1989

OTHER PUBLICATIONS

"Gulfstream G450 Systems" from code7700.com, pp. 97-101. (Year: 2016).*
(Continued)

*Primary Examiner* — William Kelleher
*Assistant Examiner* — Bobby Rushing, Jr.
(74) *Attorney, Agent, or Firm* — Lorenz & Kopf, LLP

(57) ABSTRACT

Air Turbine Starter (ATS) systems are provided, as gas turbine engines including ATS systems. In one embodiment, a gas turbine engine includes an accessory gearbox (AGB) and an integrated Air Turbine Starter (ATS) system. The AGB includes a gearbox gear train within a gearbox housing. The integrated ATS system is removably installed on the AGB and includes an ATS having an air turbine and an output shaft coupled thereto. An ATS clutch module is coupled to the ATS output shaft. The ATS clutch module is further within the gearbox housing and mechanically couples the ATS output shaft to the gearbox gear train when the integrated ATS system is installed on the AGB.

17 Claims, 3 Drawing Sheets

(51) Int. Cl.
*F02C 7/36* (2006.01)
*F02C 7/32* (2006.01)

(52) U.S. Cl.
CPC ...... *F05D 2220/32* (2013.01); *F05D 2230/51* (2013.01); *F05D 2250/41* (2013.01); *F05D 2260/4023* (2013.01); *F05D 2260/4031* (2013.01); *F05D 2260/85* (2013.01); *F05D 2260/98* (2013.01); *Y02T 50/671* (2013.01)

(58) Field of Classification Search
USPC ................ 74/6; 184/6.11; 416/169 R, 170 R
See application file for complete search history.

(56) References Cited

U.S. PATENT DOCUMENTS

| | | | |
|---|---|---|---|
| 4,899,534 A * | 2/1990 | Sorenson | F02C 7/277 192/45.1 |
| 5,257,685 A | 11/1993 | Tichiaz et al. | |
| 5,267,433 A | 12/1993 | Burch | |
| 5,419,420 A * | 5/1995 | Quenneville | F16D 43/08 192/103 A |
| 6,059,085 A * | 5/2000 | Farnsworth | F16D 9/08 192/55.1 |
| 7,445,102 B2 * | 11/2008 | Lane | F16D 41/125 192/113.32 |
| 7,547,185 B2 * | 6/2009 | Giesler | F01D 15/12 184/11.1 |
| 8,013,488 B2 | 9/2011 | Berenger et al. | |
| 8,105,018 B2 * | 1/2012 | Gockel | F02C 7/275 415/122.1 |
| 8,857,192 B2 | 10/2014 | Huang et al. | |
| 8,876,476 B2 | 11/2014 | Blewett et al. | |
| 8,881,533 B2 | 11/2014 | Copeland | |
| 8,899,910 B2 * | 12/2014 | Makulec | F01D 25/18 184/6.11 |
| 2010/0160105 A1 | 6/2010 | Sheridan et al. | |
| 2014/0202821 A1 * | 7/2014 | Schotten | F16D 41/069 192/45.1 |

OTHER PUBLICATIONS

EP Exam Report for Application No. 16162105.7-1607 dated Jul. 6, 2017.
Extended EP Search Report for Application No. 16152105.7-1607 dated Aug. 2, 2016.

* cited by examiner

AIR TURBINE STARTER SYSTEMS INCLUDING GEARBOX-INTEGRATED CLUTCH MODULES AND GAS TURBINE ENGINES EMPLOYING THE SAME

TECHNICAL FIELD

The present invention relates generally to gas turbine engines and, more particularly, to embodiments of an air turbine starter system having a clutch module integrated into the accessory gearbox of a gas turbine engine.

BACKGROUND

An Air Turbine Starter (ATS) system is commonly utilized to initialize Main Engine Start (MES) of an air-started gas turbine engine. A typical ATS system contains an ATS and a Starter Air Valve (SAV), which are fluidly coupled and removably installed on the Accessory Gearbox (AGB) of an engine. The ATS itself may include a housing, an air turbine rotatably mounted in the housing, and an ATS output shaft coupled to the air turbine and projecting from the housing. A gear train and a clutch may also be disposed in the housing between the air turbine and the ATS output shaft to provide a desired gear reduction and to prevent back-driving of the air turbine. When the ATS is installed on an AGB, the gearing of the AGB mechanically links the ATS output shaft to a spool of the engine. During MES, the SAV is opened to allow pressurized air to flow into the ATS driving rotation of the air turbine and the ATS output shaft. Rotation of the ATS output shaft, in turn, drives rotation of the engine spool or spools through the AGB. After MES has been achieved, the SAV is closed and pressurized airflow to the ATS ceases. The ATS system may thus remain inactive until MES is again required. However, even when the ATS is inactive, the ATS output shaft and portions of the ATS clutch may continue to rotate rapidly as the output shaft is driven through the AGB by rotation of the engine spool(s).

In addition to the above-mentioned components, an ATS is also commonly equipped with a shaft-driven oil pump, which draws oil from a sump and injects the oil directly into the clutch or onto a nearby rotating body such that oil is thrown into the clutch via centrifugal forces during ATS operation. After flowing through the clutch, the oil returns to the sump by gravity flow to form a relatively simple, self-contained lubrication system. While providing certain advantages in view of its simplicity, such an ATS lubrication system is limited in several respects. For example, the ATS lubrication system typically lacks means for filtering, pressurizing, cooling, or otherwise conditioning the oil. As a result, the oil contained within the ATS may be prone to gradual fouling due to, for example, heat exposure and contamination resulting from seal degradation. Additionally, the ATS typically contains a relatively small volume of oil, which may further diminish due to leakage and decay occurring over the service life of the ATS. Issues relating to oil quality and quantity can thus increase maintenance requirements and impose undesirable limitations on the overall operational lifespan of an ATS.

It is thus desirable to provide an ATS having enhanced lubrication properties, which could favorably reduce maintenance requirements and prolong the operational lifespan of the ATS. More generally, it would be desirable to provide an ATS system including such an ATS and also having a reduced weight, complexity, envelope, and part count as compared to conventional ATS systems. It would also be desirable if, in at least some embodiments, the ATS system could be designed to provide high levels of modularity to facilitate in-line repair and replacement of components included within the ATS system. Other desirable features and characteristics of the present invention will become apparent from the subsequent Detailed Description and the appended Claims, taken in conjunction with the accompanying Drawings and the foregoing Background.

BRIEF SUMMARY

Embodiments of a gas turbine engine including an Air Turbine Starter (ATS) system are provided. In one embodiment, a gas turbine engine includes an accessory gearbox (AGB) and an integrated Air Turbine Starter (ATS) system. The AGB includes a gearbox gear train within a gearbox housing. The integrated ATS system is removably installed on the AGB and includes an ATS having an air turbine and an output shaft coupled thereto. An ATS clutch module is coupled to the ATS output shaft. The ATS clutch module is received within the gearbox housing and mechanically couples the ATS output shaft to the gearbox gear train when the integrated ATS system is installed on the AGB.

In another embodiment, the gas turbine engine includes an AGB containing a gearbox gear train, an ATS having an ATS output shaft coupled to the gearbox gear train, and an ATS clutch coupled between the ATS output shaft and the gearbox gear train. The ATS clutch includes, in turn, a first race formed on the ATS output shaft, a second race co-axial with the first race, and a plurality of unidirectional clutch elements disposed between the first and second races.

Embodiments of an integrated ATS system are further provided for usage in conjunction with an AGB having a gearbox housing containing a gearbox gear train. In one embodiment, the integrated ATS system includes an ATS and an ATS clutch module, which is coupled to an output shaft of the ATS. The ATS clutch module is received in the gearbox housing and mechanically couples the ATS output shaft to the gearbox gear train when the integrated ATS system is installed on the AGB.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
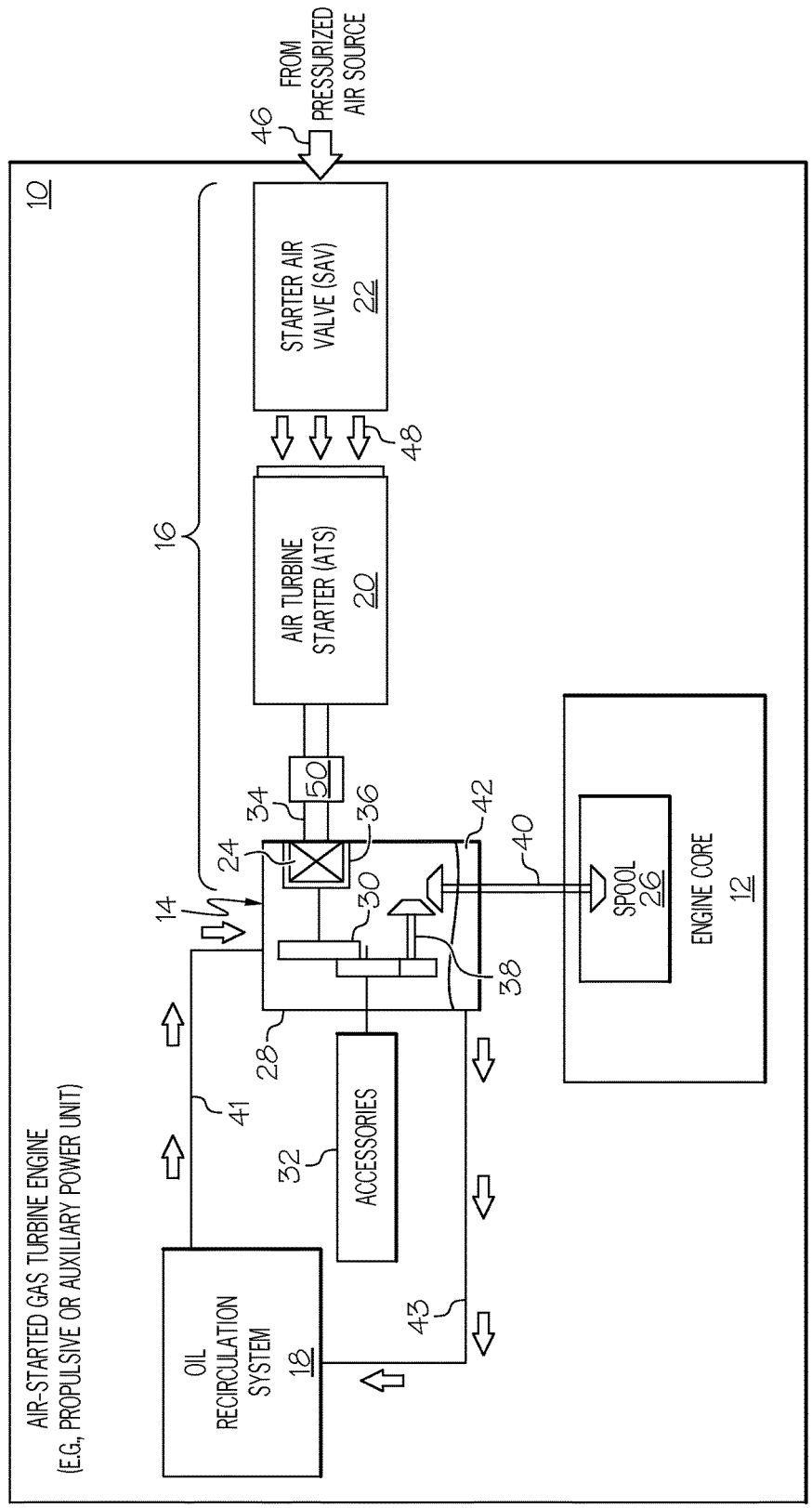
FIG. 1 is a schematic illustrating an exemplary gas turbine engine including an integrated Air Turbine Starter (ATS) system, an engine gearbox, an oil recirculation system, and an engine core, as illustrated in accordance with an exemplary embodiment of the present invention.

The following Detailed Description is merely exemplary in nature and is not intended to limit the invention or the application and uses of the invention. Furthermore, there is no intention to be bound by any theory presented in the preceding Background or the following Detailed Description.

As described in the foregoing section entitled "BACKGROUND," degradations in oil quality and quantity within a conventional Air Turbine Starter (ATS) can increase maintenance requirements and impose undesirable limitations on the operational lifespan of the ATS. To overcome such limitations, and to provide certain other benefits, the following describes embodiments of an integrated ATS system in which the ATS clutch is effectively removed from the ATS housing and relocated within the Accessory Gearbox (AGB) of a Gas Turbine Engine (GTE). By relocating the ATS clutch into the AGB, the ATS clutch can be availed of the oil (or other lubricant) circulated through AGB, which is typically maintained at a greater quantity and higher quality (due to filtering, cooling, and/or pressurization by an oil recirculation system) relative to the volume of oil contained within the closed lubrication system of the ATS. The service lifespan of the ATS can be improved as a result, while ATS system maintenance requirements are reduced. The ATS clutch is advantageously implemented as a module, which can be readily removed from the AGB to facilitate in-line replacement without disassembly of the AGB. Furthermore, in certain embodiments, the ATS clutch module can also be designed for quick disconnection from the ATS output shaft to provide a still higher level of modularity by, for example, implementing the ATS clutch module and the ATS as separate Line Replaceable Units (LRUs).

Benefits beyond reductions in maintenance requirements and improvements in ATS service life can be realized by integrating the ATS clutch into the AGB in the above-described manner. For example, relocating the ATS clutch into the AGB can enable certain components, such as overrun bearings and seals, to be eliminated from the ATS to reduce the overall part count, complexity, envelope, and weight of the ATS. Additionally, when integrated into the AGB, the ATS clutch can be configured to prevent torque transfer to the ATS output shaft after MES. As a result, the amount of time the ATS output shaft remains active per flight can be greatly reduced as compared to conventional ATS systems in which the ATS output shaft continues to spin while the GTE remains operational. Specifically, by allowing the ATS output shaft to return to a static state after MES, which is typically relatively short in duration (e.g., on the order of 60 seconds), the heat exposure and wear imparted to the ATS components can be minimized to further improve ATS service life. In some embodiments, still further savings in part count, complexity, envelope, and weight can be realized by: (i) eliminating the gear train from the ATS (or reducing the complexity of the ATS gear train) and providing the desired reduction through the gearing of the AGB, and/or (ii) by designing the ATS output shaft to serve as a race of the ATS clutch module. Additional description of such features is provided below in conjunction with FIGS. 1-3.

FIG. 1 is a schematic illustrating an exemplary air-started GTE 10, as illustrated in accordance with an exemplary embodiment of the present invention. GTE 10 includes a an engine core 12, an AGB 14, an integrated ATS system 16, and an oil recirculation system 18. Integrated ATS system 16 includes, in turn, an ATS 20, a Starter Air Valve (SAV) 22, and a clutch module 24, which is matingly received within the housing of AGB 14 and which can be withdrawn therefrom during in-line maintenance or repair. The manner in which ABG 14, ATS 20, and clutch module 24 interface in the illustrated example is described more fully below in conjunction with FIGS. 2 and 3. ATS 20 is mechanically linked to a spool 26 contained within GTE 10 through AGB 14 and clutch module 24. ATS 20 and, more generally, ATS system 16 can thus be utilized to initiate rotation of spool 26 during MES of air-started GTE 10. GTE 10 will often be deployed on an aircraft as a propulsive engine, an Auxiliary Power Unit (APU), or a turboshaft engine. However, GTE 10 is not limited to such applications and can be deployed onboard other vehicles (e.g., watercraft and land vehicles) or employed in non-vehicle applications, such as industrial power generation applications. Furthermore, while illustrated in FIG. 1 as including a single spool, engine core 12 may include two or more spools in further embodiments of GTE 10.

AGB 14 includes a gearbox housing 28 containing a gearbox gear train 30. Gearbox gear train 30 is schematically illustrated in FIG. 1 in a simplified, generic form with the understanding that gear train 30 can assume any form suitable for mechanically linking ATS 20 to a spool of engine core 12, providing that gear train 30 includes at least two meshing gears. Gearbox gear train 30 will often include a jackshaft arrangement to drive a number of different accessories 32 mounted to gearbox housing 28 at different rotational speeds. In certain embodiments, gearbox gear train 30 can also include a planetary gear system, depending upon the desired gear reduction between ATS 20 and engine core 12, packaging constraints, and other design factors. Any number and type of accessories 32 can be mounted to gearbox housing 28 and driven through AGB 14 by engine core 12 during operation thereof. Gearbox accessories 32 can include, but are not limited to, oil pumps, fuel pumps, hydraulic pumps, and generators. All of the foregoing components may be implemented as individual LRUs; that is, modular components or devices that can be quickly removed and replaced in-field without disassembly of GTE 10. ATS 20, SAV 22, and clutch module 24 may also be advantageously implemented as a number of LRUs, as described more fully below in conjunction with FIG. 3.

ATS 20 includes an air turbine (shown in FIGS. 2 and 3) and an ATS output shaft 34, which is mechanically coupled to clutch module 24 and, in preferred embodiments, may serve as a race for the clutch elements contained in module 24. When ATS system 16 is installed on AGB 14, clutch module 24 is received in gearbox housing 28 and may be readily removable therefrom. Gearbox gear train 30 includes a mechanical input 36 (e.g., a first gear), which engages clutch module 24 when received in gearbox housing 28; and a mechanical output 38 (e.g., a second gear), which is coupled to spool 26 of engine core 12 through a tower shaft 40. The term "input," the term "output," and similar terms and phrases are utilized herein with respect to the position of the motive force or driver (i.e., ATS system 16) during MES. Lubrication of clutch module 24 and/or gearbox gear train 30 is provided by oil recirculation system 18, which is fluidly coupled to gearbox housing 28 via flow lines 41 and 43. During operation of AGB 14, oil recirculation system 18 draws oil from a sump 42 located within a lower portion of gearbox housing 28, conditions the oil, and then returns the conditioned oil to AGB 14. Recirculation system 18 may condition the circulated oil by any combination of filtering, pressurizing, and temperature regulation. The oil returned to AGB 14 by recirculation system 18 is directed into one or more of the rotating components contained in AGB 14 and is preferably directed into clutch module 24, as described more fully below in conjunction with FIG. 2. After flowing through and lubricating the rotating components of AGB 14, the oil returns to sump 42 to complete the flow circuit.

As indicated in FIG. 1 by arrow 46, pressurized airflow is supplied to SAV 22 during MES. SAV 22 is controlled by a non-illustrated engine controller (e.g., a Full Authority Digital Engine Controller or "FADEC") to throttle the pressurized airflow, which is then directed into ATS 20, as further indicated in FIG. 1 by arrows 48. The airflow drives rotation of an air turbine contained within ATS 20, which, in turn, drives rotation of ATS output shaft 34. ATS output shaft 34 then drives rotation of gearbox gear train 30 through clutch module 24, which, in turn, drives the rotation of spool 26 through tower shaft 40. When the rotational speed of spool 26 is sufficient to maintain a minimum air intake into engine core 12, SAV 22 may be moved to a closed position, pressurized airflow to ATS system 16 may cease, and integrated ATS system 16 may be deactivated. After MES, spool 26 spins at a relatively high rate of speed to drive further movement of gearbox gear train 30 and thereby support operation of accessories 32 coupled to the mechanical outputs of AGB 14. When input gear 36 rotates at a higher rate of speed than does the mechanical input of clutch module 24 connected to or integrally formed with ATS output shaft 34, clutch module 24 disengages and shaft 34 ceases to rotate. As a result, ATS 20 returns to a static state after the relatively quick MES process to reduce component wear and heat generation within ATS 20. If desired, a shaft decoupler mechanism 50 (e.g., a shear section decoupler) can further be connected to or integrated into ATS output shaft 34 to provide redundancy with clutch module 24 and/or to provide overrun protection should the rotational speed of ATS output shaft 34 become undesirably high.

Figure 2:
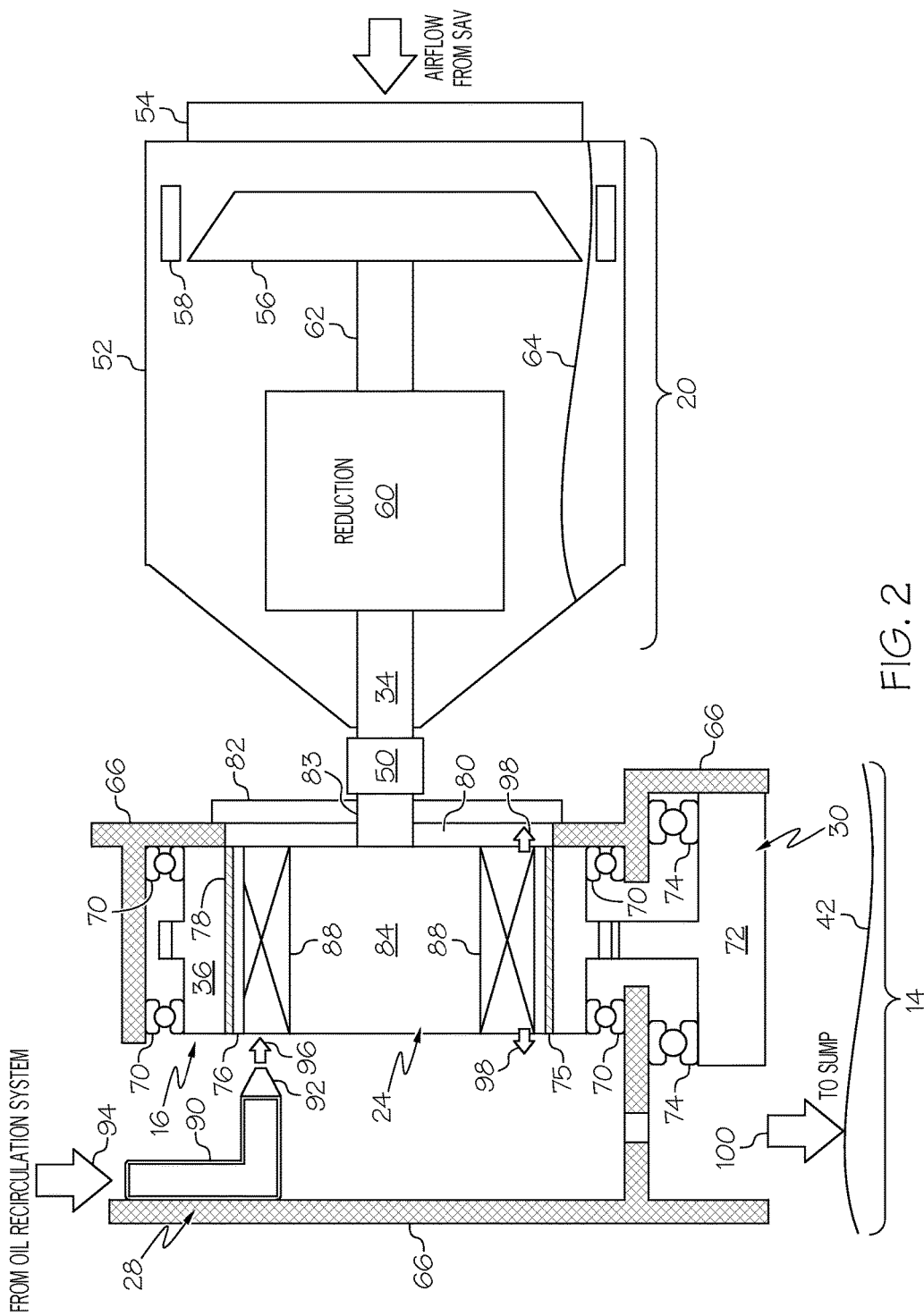
FIG. 2 is a detailed schematic of the integrated ATS system and a portion of the engine gearbox shown in FIG. 1, as illustrated during operation of the ATS system and illustrated in accordance with an exemplary embodiment of the present invention.

FIG. 2 is a more detailed schematic of ATS 20, ATS clutch module 24, and a portion of AGB 14, as illustrated in accordance with an exemplary embodiment. In this view, it can be seen that ATS 20 includes an ATS housing 52 having an inlet 54, an air turbine 56 rotatably mounted in ATS housing 52, and an ATS containment ring 58 surrounding air turbine 56. ATS 20 further includes a reduction 60, such as a planetary gear system, which is coupled to ATS output shaft 34 and to air turbine 56 via an internal shaft 62. When provided, reduction 60 provides a desired gear reduction between air turbine 56 and ATS output shaft 34 on the order of, for example, 13:1. In further embodiments, ATS 20 may lack reduction 60 and instead rely on a simple "solid shaft" connection to couple air turbine 56 to ATS output shaft 34 such that the rotational rate between turbine 56 and shaft 34 is 1:1. In this latter case, the desired gear reduction can be achieved entirely through the gearing of gearbox gearing 30 to enable still further reductions in the overall complexity, size, envelope, and weight of ATS 20. Finally, as indicated in FIG. 2, an oil-containing sump 64 may be provided in a lower portion of ATS housing 52. During operation of ATS 20, a shaft-driven oil pump (not shown) may draw oil from sump 64 and inject the oil into the rotating components of ATS 20, such as reduction 60 (if present), to maintain these components in a lubricated state.

In the exemplary embodiment illustrated in FIG. 2, mechanical input 36 of gearbox gearing 30 assumes the form of a gear having a central opening 75 in which clutch module 24 is matingly received; consequently, mechanical input 36 will be referred to hereafter as "input gear 36" for convenience of reference and with the understanding that input 36 can assume other forms in alternative embodiments. Input gear 36 is supported by a number of rolling element bearings 70, which pilot to internal walls 66 of gearbox housing 28. Input gear 36 engages a second gear 72 included within gearbox gearing 30, which is further supported by rolling element bearings 74 (partially shown). Clutch module 24 is received within central opening 75 of input gear 36 (identified in FIG. 3) such that a race of module 24 is coupled to input gear 36 in a rotational fixedly manner. For example, as generically indicated in FIG. 2 by cross-hatching, a splined interface 78 can be formed between the inner circumferential surface of input gear 36 defining central opening 75 and the outer race of clutch module 24, which can be provided on the interior of an outer ring member 76 in an embodiment. An access port 80 is provided in gearbox housing 28 to permit access to central opening 75 of input gear 36. Such an arrangement enables clutch module 24 to be readily removed from AGB 14 for in-line replacement, as described more fully below in conjunction with FIG. 3. Finally, a cover 82 can be disposed over access port 80 and affixed to gearbox housing 28 utilizing, for example, a plurality of bolts or other such fasteners (not shown). A central opening 83 is provided in cover 82 to permit the passage of ATS output shaft 34.

Figure 3:
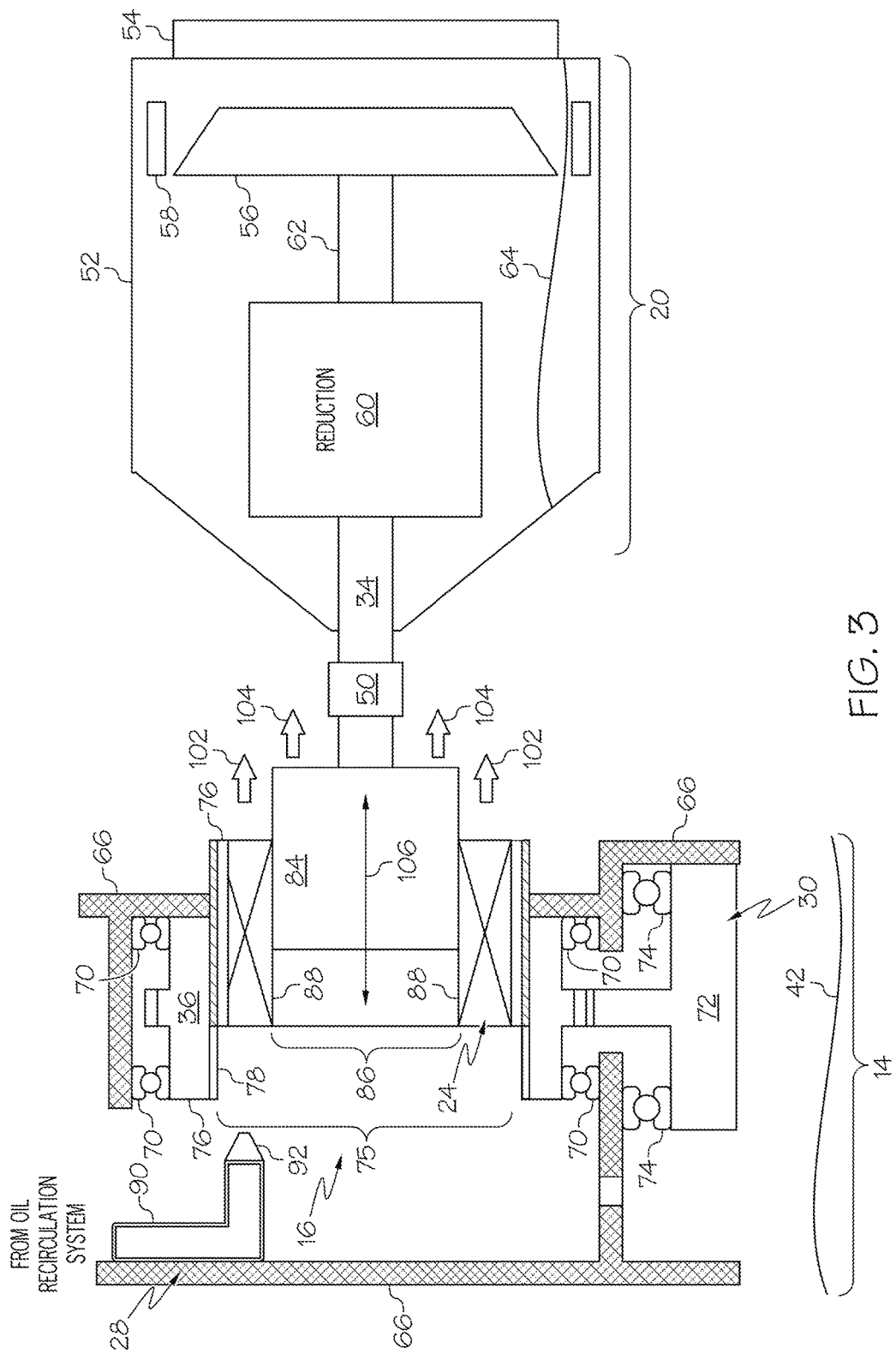
FIG. 3 is a schematic of the integrated ATS system and a portion of the engine gearbox shown in FIG. 2 illustrating one manner in which different portions of the ATS system can be implemented as Line Replaceable Units, as further illustrated in accordance with an exemplary embodiment of the present invention.

Oil circulated by oil recirculation system 18 (FIG. 1) flows through clutch module 24 during operation of ATS system 16. In certain embodiments, this may be accomplished by directing oil onto a nearby rotating component that throws oil into clutch module 24 due to centrifugal forces. It is preferred, however, that at least one jet or stream of oil is directed into clutch module 24 during ATS system operation. For example, as shown in FIGS. 2 and 3, an oil flow passage 90 having an oil outlet 92 may further be provided in gearbox housing 28 of AGB 14. As indicated in FIG. 2 by arrow 94, oil flow passage 90 is fluidly coupled to and receives oil from oil recirculation system 18 (FIG. 1). Outlet 92 may be positioned to direct a stream or jet of oil into clutch module 24, as indicated by arrow 96 in FIG. 2. Specifically, in the illustrated example, outlet 92 assumes the form of a nozzle located laterally adjacent an open side of clutch module 24 and positioned so as to direct a stream of oil into clutch elements 88 and the raceway of module 24. Rotation of the components of clutch module 24 and/or terminal end 84 of ATS output shaft 34 then distributes oil throughout module 24 to provide the desired lubrication. As indicated in FIG. 2 by arrows 98, a certain amount of oil outflows from a lower portion of clutch module 24 and possibly flows over other rotating components of AGB 14 (e.g., gear 36, gear 72, bearings 70, bearings 74, etc.) before returning to sump 42 (represented in FIG. 2 by arrow 100). Oil recirculation system 18 (FIG. 1) continues to draw oil from sump 42, condition the oil, and then return the oil to flow passage 90 to complete the flow circuit. In this manner, clutch module 24 and mating terminal end 84 of ATS output shaft 34 are provided with a continual supply of oil, which is maintained at a relatively high quality level by oil recirculation system 18 and which is present in a greater volume than the oil contained within the self-contained lubrication system of ATS 20. The overall lifespan and maintenance characteristics of ATS system 16 can be improved as a result.

ATS output shaft 34 can be mechanically coupled to clutch module 24 in any manner enabling torque transmission therebetween. It is preferred, however, that ATS output shaft 34 is coupled to clutch module 24 in a manner: (i) that enables clutch module 24 to be readily detached from output shaft 34 to facilitate the replacement of either clutch module 24 or ATS 20, and (ii) that further reduces the complexity and part count of ATS system 16. Both of these criteria can be satisfied by leveraging ATS output shaft 34 to serve as a race for clutch module 24. Stated differently, clutch module 24 can be produced to include only a single race (either the inner or outer race), while the other race is provided on ATS output shaft 34. Consider, for example, the embodiment shown in FIG. 2 wherein ATS output shaft 34 is produced to include enlarged, substantially cylindrical terminal end 84. When ATS output shaft 34 engages clutch module 24, cylindrical terminal end 84 is matingly received within a central opening 86 provided in clutch module 24 (identified in FIG. 3). Cylindrical terminal end 84 is imparted with a smooth, annular outer surface that contacts the unidirectional clutch elements of clutch module 24 (generically represented in FIG. 2 by graphic 88). Unidirectional clutch elements 88 can be, for example, sprags, a paw and ratchet elements, or any other clutch element suitable for providing unidirectional torque transfer from ATS output shaft 34 (the inner race in the illustrated example) to the outer race provided on ring member 76 and, therefore, to input gear 36 of gearbox gear train 30. By levering terminal end 84 of ATS output shaft 34 to serve as an inner race for clutch module 24 in this manner (or as the outer race for module 24 in further embodiments), the complexity, size, and weight of clutch module 24 can be reduced. Additionally, terminal end 84 can be imparted with a smooth, annular outer surface utilizing relatively straightforward and cost-effective manufacturing techniques, such as turning or grinding. This may further decrease the manufacturing cost and complexity of ATS system 16 avoiding the need to create a geometrically complex, rotationally-fixed coupling (e.g., curvic or splined-type coupling) between the end of ATS output shaft 34 and clutch module 24.

In preferred embodiments, the interface between clutch module 24 and ATS output shaft 34 enables clutch module 24 to be readily detached from ATS 20 to facilitate the replacement of either clutch module 24 or ATS 20. In the illustrated example, ATS output shaft 34 can be disengaged from clutch module 24 by simply withdrawing enlarged shaft end 84 from the ring of clutch elements 88, which may be retained in their desired positions by a cage or similar retention structure upon removal of shaft end 84. This may be more fully appreciated by referring to FIG. 3 wherein arrows 102 indicate the manner in which clutch module 24 can be withdrawn from gearbox housing 28 along an insertion/withdrawal axis 106 co-axial with the longitudinal axis of ATS output shaft 34, while arrows 104 further indicate the manner in which terminal end 84 of ATS output shaft 34 can be withdrawn from clutch module 24 along insertion/withdrawal axis 106. Such a structural configuration enables clutch module 24 and ATS 20 to be produced as separate LRUs to facilitate in-field replacement of clutch module 24, of ATS 20, or of both clutch module 24 and ATS 24, as circumstances dictate. In alternative embodiments, such a high level of modularity can also be achieved by producing the terminal end 84 of ATS output shaft 34 to have a cup-like or tubular geometry and serve as the outer race for clutch module 24. These advantages notwithstanding, ATS 20 and clutch module 24 need not be implemented as separate LRUs in all embodiments, in which case removal or detachment of ATS output shaft 34 from clutch module 24 may require disassembly of ATS 20.

There has thus been provided multiple exemplary embodiments of a gas turbine engine including an integrated ATS system. The ATS system is "integrated" in the sense that components of the system, most notably the ATS clutch, are incorporated into the accessory gearbox of a gas turbine engine to a greater extent than in conventional ATS systems. While the foregoing has described the ATS clutch as "integrated" into an accessory gearbox of an engine, this term and the foregoing description do not preclude the possibility that the accessory gearbox can be capable of functioning without the ATS clutch or that the ATS clutch can be readily removable from the gearbox in some embodiments. Indeed, as described in detail above, the ATS clutch is preferably implemented as a module that is readily removable from the accessory gearbox without disassembly thereof to facilitate in-line repair or in-field replacement of the clutch. The ATS clutch is also preferably (although not necessarily) readily detachable from the ATS output shaft to permit in-line replacement of either the clutch or the ATS, which can be implemented as separate LRUs in at least some embodiments. Integration of the ATS clutch into the accessory gearbox in this manner can greatly reduce part count, weight, complexity, and envelope of the ATS system. Of equal if not greater benefit, relocation of the ATS clutch into the accessory gearbox and the provision of plumbing within the gearbox for lubrication of the ATS clutch enables lubrication of the clutch with the oil (or other lubricant) circulated through the accessory gearbox, which may be maintained at a relatively high quality level by a dedicated recirculation system fluidly coupled to the accessory gearbox. The end result is an improved ATS system having reduced maintenance requirements and a prolonged operational lifespan.

In one embodiment, a GTE (10) includes an AGB (14) having a gearbox gear train (30) within a gearbox housing (28). An integrated ATS system (16) is removably installed on the AGB and includes: (i) an ATS (20) including an air turbine (56) and an output shaft (34) coupled thereto, and (ii) an ATS clutch module (24) coupled to the ATS output shaft. The ATS clutch module is received within the gearbox housing and mechanically couples the ATS output shaft to the gearbox gear train when the integrated ATS system is installed on the AGB. In certain cases, the ATS clutch module may include: (i) a first race formed on a mating end portion (84) of the ATS output shaft (e.g., the outer circumferential surface of shaft end 84 shown in FIGS. 2 and 3), (ii) a second race co-axial with the first race (e.g., the inner circumferential surface of splined ring 76 shown in FIGS. 2 and 3), and (iii) a plurality of unidirectional clutch elements disposed between the first and second races (generically represented in FIGS. 2 and 3 by graphic 88). The gearbox gear train may further include an input gear (36) and a splined interface (78), which is coupled to the input gear and which engages the splined ring to provide a rotationally fixed coupling when the integrated ATS is installed on the AGB. Furthermore, the input gear may have a central opening (75) into which the ATS clutch module and the mating end portion of the ATS output shaft are inserted when the integrated ATS is installed on the AGB. The splined interface may be formed on an inner circumferential surface of the input gear around the central opening, in which case the first and second races may be inner and outer races, respectively. In still further embodiments, the ATS clutch module may include a plurality of unidirectional clutch elements distributed around a rotational axis of the ATS clutch module (co-axial with axis 106 shown in FIG. 3), and a central opening (86) configured to conformally receive a mating end portion (84) of the output shaft. Furthermore, the mating end portion of the output shaft engaging the plurality of unidirectional clutch elements when inserted into the central opening. In this case, the mating end portion of the output shaft may be removable from the ATS clutch module without disassembly thereof. In other embodiments, the integrated ATS system may further include an oil recirculation system (18), which is fluidly coupled to the AGB and which has an oil outlet (92) disposed in the gearbox housing and positioned to direct oil flow into the ATS clutch module during operation of the AGB. As a specific example, the oil outlet may be disposed laterally adjacent the ATS clutch module when the integrated ATS system is installed on the AGB to direct a jet or stream of oil into an open side of the ATS clutch module during operation of the AGB.

In still further embodiments, a GTE (10) may include an AGB (14) containing a gearbox gear train (30), an ATS (20) having an ATS output shaft (34) coupled to the gearbox gear train; and an ATS clutch (24, 84) coupled between the ATS output shaft and the gearbox gear train. The ATS clutch may include, in turn, a first race formed on the ATS output shaft (e.g., the outer circumferential surface of shaft end 84), a second race co-axial with the first race (e.g., the inner circumferential surface of ring 76), and a plurality of unidirectional clutch elements (88) disposed between the first and second races. A portion of the clutch may be implemented as an ATS clutch module (24), which contains the second race and the plurality of unidirectional clutch elements. Additionally, the gearbox gear train may include a mechanical input (36), and the accessory gearbox may have an access port (80) through which the ATS clutch module can be inserted along an insertion/withdrawal axis (106) to matingly engage the mechanical input. Finally, in embodiments wherein the ATS output shaft has an enlarged end portion (84) on which the first race is formed, it may be possible to withdrawal the enlarged end portion from the ATS clutch module along the insertion/withdrawal axis to disconnect the ATS from the ATS clutch module.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A gas turbine engine, comprising:
   an accessory gearbox (AGB), comprising:
      a gearbox housing; and
      a gearbox gear train within the gearbox housing;
   an integrated Air Turbine Starter (ATS) system removably installed on the AGB, the integrated ATS system comprising:
      an ATS including an air turbine and an ATS output shaft coupled thereto, the ATS output shaft having a mating end portion received in the gearbox housing when the integrated ATS system is installed on the AGB; and
      an ATS clutch module coupled to the ATS output shaft, the ATS clutch module received within the gearbox housing and mechanically coupling the ATS output shaft to the gearbox gear train when the integrated ATS system is installed on the AGB, the ATS clutch module comprising:
         a plurality of unidirectional clutch elements distributed around a rotational axis of the ATS clutch module; and
         a central opening configured to receive the mating end portion of the output shaft, the mating end portion of the output shaft engaging the plurality of unidirectional clutch elements when inserted into the central opening;
      an oil recirculation system fluidly coupled to the AGB, the oil recirculation system having an oil outlet positioned to direct a jet of oil into an open side of the ATS clutch module and onto the mating end portion of the ATS output shaft during operation of the gas turbine engine.

2. The gas turbine engine of claim 1 wherein the ATS clutch module comprises:
   a first race formed on the mating end portion of the ATS output shaft;
   a second race co-axial with the first race; and
   a plurality of unidirectional clutch elements captured between the first and second races.

3. The gas turbine engine of claim 2 wherein the ATS clutch module further comprises a splined ring on which the second race is formed.

4. The gas turbine engine of claim 3 wherein the gearbox gear train comprises:
   an input gear; and
   a splined interface coupled to the input gear and engaging the splined ring to provide a rotationally fixed coupling when the integrated ATS is installed on the AGB.

5. The gas turbine engine of claim 4 wherein the input gear has a central opening into which the ATS clutch module and the mating end portion of the ATS output shaft are inserted when the integrated ATS is installed on the AGB.

6. The gas turbine engine of claim 5 wherein the splined interface is formed on an inner circumferential surface of the input gear around the central opening, wherein the first race is an inner race, and wherein the second race is an outer race.

7. The gas turbine engine of claim 1 wherein the mating end portion of the output shaft is removable from the ATS clutch module without disassembly thereof.

8. The gas turbine engine of claim 1 wherein the ATS further comprises a decoupler mechanism integrated into the ATS output shaft and limiting the rate of rotation between the air turbine and the ATS clutch module in at least one rotational direction.

9. The gas turbine engine of claim 8 wherein the air turbine is fixedly coupled to the output shaft such that that the ratio of rotation between the air turbine and the output shaft is 1:1.

10. The gas turbine engine of claim 1 the ATS clutch module is configured to rotationally disengage the ATS from the gearbox gear train after main engine start of the gas turbine engine.

11. An integrated Air Turbine Starter (ATS) system for usage in conjunction with an accessory gearbox (AGB) having a gearbox housing containing a gearbox gear train, the integrated ATS system comprising:
   an ATS comprising:
      an air turbine; and
      an ATS output shaft coupled to the air turbine, the ATS output shaft having a mating end portion received in the gearbox housing when the integrated ATS system is installed on the AGB; and
   an ATS clutch module coupled to the ATS output shaft, the ATS clutch module received in the gearbox housing and mechanically coupling the ATS output shaft to the gearbox gear train when the integrated ATS system is installed on the AGB, the ATS clutch module comprising:
      a first race formed on a mating end portion of the ATS output shaft;
      a second race co-axial with the first race; and
      a plurality of unidirectional clutch elements captured between the first and second races;

wherein the mating end portion of the ATS output shaft is imparted with a smooth annular surface, which serves as a race for the ATS clutch module and which can be withdrawn from the ATS clutch module along an insertion/withdrawal axis to disconnect the ATS from the ATS clutch module.

12. The integrated ATS system of claim 11 wherein the ATS module comprises a splined ring member, which circumscribes the plurality of unidirectional clutch elements.

13. The integrated ATS system of claim 11 wherein the ATS clutch module can further be withdrawn from the AGB along the insertion/withdrawal axis to disconnect ATS clutch module from the gearbox gear train.

14. A gas turbine engine, comprising:
an accessory gearbox (AGB), comprising:
  a gearbox housing; and
  a gearbox gear train within the gearbox housing;
an integrated Air Turbine Starter (ATS) system removably installed on the AGB, the integrated ATS system comprising:
  an ATS including an air turbine and an ATS output shaft coupled thereto, the ATS output shaft having a mating end portion received in the gearbox housing when the integrated ATS system is installed on the AGB; and
  an ATS clutch module coupled to the ATS output shaft, the ATS clutch module received within the gearbox housing and mechanically coupling the ATS output shaft to the gearbox gear train when the integrated ATS system is installed on the AGB; and
  wherein the ATS clutch module comprises:
    a plurality of unidirectional clutch elements distributed around a rotational axis of the ATS clutch module; and
    a central opening configured to receive the mating end portion of the ATS output shaft, the mating end portion of the ATS output shaft engaging the plurality of unidirectional clutch elements when inserted into the central opening.

15. The gas turbine engine of claim 14 wherein the mating end portion of the ATS output shaft is imparted with a smooth annular surface, which serves as a race for the ATS clutch module and which can be withdrawn from the ATS clutch module along an insertion/withdrawal axis to disconnect the ATS from the ATS clutch module; and
wherein the ATS clutch module can further be withdrawn from the AGB along the insertion/withdrawal axis to disconnect ATS clutch module from the gearbox gear train.

16. The gas turbine engine of claim 14 further comprising an oil recirculation system fluidly coupled to the AGB, the oil recirculation system having an oil outlet positioned to direct a jet of oil into an open side of the ATS clutch module when the integrated ATS system is installed on the AGB.

17. The gas turbine engine of claim 14 further comprising:
an input gear included in the gearbox gear train; and
a splined interface formed between the input gear and the ATS clutch module, the splined interface providing a rotationally fixed coupling between the input gear and the ATS clutch module when the integrated ATS system is installed on the AGB.

* * * * *